United States Patent
Usuginu (10) Patent No.: US 9,853,673 B2
(45) Date of Patent: Dec. 26, 2017

(54) CRADLE DEVICE INCLUDING A LOCKER AND A PUSH UP MEMBER AND CRADLE SET

(71) Applicant: Panasonic Intellectual Property Management Co., Ltd., Osaka (JP)

(72) Inventor: Yutaro Usuginu, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 1 day.

(21) Appl. No.: 15/048,298

(22) Filed: Feb. 19, 2016

(65) Prior Publication Data
US 2016/0248465 A1    Aug. 25, 2016

(30) Foreign Application Priority Data

Feb. 23, 2015 (JP) ................................. 2015-032422
Nov. 17, 2015 (JP) ................................. 2015-224367

(51) Int. Cl.
| | |
|---|---|
| *H04B 1/38* | (2015.01) |
| *H04M 1/02* | (2006.01) |
| *H04B 1/3877* | (2015.01) |
| *H04B 1/3827* | (2015.01) |

(52) U.S. Cl.
CPC ......... *H04B 1/3877* (2013.01); *H04B 1/3833* (2013.01); *H04M 1/0202* (2013.01)

(58) Field of Classification Search
CPC ..... H04B 1/3877; H04B 1/3833; H04M 1/02; H04M 1/0202
USPC ..... 455/575.1–575.6, 550.1, 90.1–90.3, 557, 455/556.1, 347, 348, 349, 350
See application file for complete search history.

(56) References Cited

U.S. PATENT DOCUMENTS

| | | |
|---|---|---|
| 4,609,790 A | 9/1986 | Kaiwa et al. |
| 4,700,383 A | 10/1987 | Takagi et al. |
| 5,737,808 A | 4/1998 | Ikeda |
| 6,353,536 B1 | 3/2002 | Nakamura et al. |
| 2003/0068986 A1* | 4/2003 | Oh ..................... B60R 11/0241 455/90.1 |

FOREIGN PATENT DOCUMENTS

| | | |
|---|---|---|
| JP | 59-072062 | 5/1984 |
| JP | 61-030851 A | 2/1986 |
| JP | H09-238716 A | 9/1997 |
| JP | 2000-029559 A | 1/2000 |
| JP | 2003-069682 A | 3/2003 |

* cited by examiner

*Primary Examiner* — Philip Sobutka
(74) *Attorney, Agent, or Firm* — McDermott Will & Emery LLP (57) ABSTRACT

A cradle device removably stores a terminal device having a first recess. This cradle device includes a second recess, a locker, and a push up member. The second recess is capable of storing at least a part of the terminal device, the part including the first recess. The locker is formed to be engageable with the first recess of the terminal device, and the locker being engaged with the first recess, which is stored in the second recess, of the terminal device to hold the terminal device. The push up member is connected to the locker, and pushes up the locker engaged with the first recess to push up the terminal device from the second recess with the state in which the terminal device is held by the locker.

12 Claims, 11 Drawing Sheets

CRADLE DEVICE INCLUDING A LOCKER AND A PUSH UP MEMBER AND CRADLE SET

RELATED APPLICATIONS

This application claims the benefit of priority of Japanese Application No. 2015-032422, filed on Feb. 23, 2015, and Japanese Application No. 2015-224367, filed Nov. 17, 2015, the disclosures of which are incorporated by reference herein.

BACKGROUND

1. Field of the Disclosure

The present disclosure relates to a cradle device that removably holds a terminal device.

2. Background Art

Unexamined Japanese Patent Publication No. 2003-69682 (Patent Literature 1) discloses a cradle device that removably holds a handset. With this cradle device, when a user removes the handset from the cradle device, the handset is changed into a state of being popped up from the cradle device from a state of being stored in the cradle device. Accordingly, the user can easily remove the handset from the cradle device.

SUMMARY

The present disclosure provides a cradle device that removably holds a terminal device and can prevent the terminal device from falling when a user removes the terminal device.

The cradle device according to the present disclosure removably stores a terminal device having a first recess. This cradle device includes a second recess, a locker, and a push up member. The second recess is capable of storing at least a part of the terminal device, the part including the first recess. The locker is formed to be engageable with the first recess of the terminal device, and the locker being engaged with the first recess, which is stored in the second recess, of the terminal device to hold the terminal device. The push up member is connected to the locker, and pushes up the locker engaged with the first recess to push up the terminal device from the second recess with the state in which the terminal device is held by the locker.

A cradle set according to the present disclosure includes a terminal device having a first recess and a cradle device that removably stores the terminal device. The cradle device includes a second recess, a locker, and a push up member. The second recess is capable of storing at least a part of the terminal device, the part including the first recess. The locker is formed to be engageable with the first recess of the terminal device, and the locker being engaged with the first recess, which is stored in the second recess, of the terminal device to hold the terminal device. The push up member is connected to the locker, and pushes up the locker engaged with the first recess to push up the terminal device from the second recess with the state in which the terminal device is held by the locker.

The cradle device according to the present disclosure is effective to prevent the terminal device from falling, when the user removes the terminal device.

DETAILED DESCRIPTION

Hereinafter, exemplary embodiments will be described in detail with reference to the accompanying drawings as necessary. It is noted, however, that descriptions in more detail than necessary will sometimes be omitted. For example, detailed descriptions of well-known items and duplicate descriptions of substantially the same configuration will sometimes be omitted. This is to avoid unnecessary redundancy in the following description and to facilitate understanding by those skilled in the art.

Note that the accompanying drawings and the following descriptions are provided so as to facilitate fully understanding of the present disclosure by those skilled in the art, and these are not intended to limit the subject matter defined by the claims.

Unless otherwise specified, reference numerals, symbols, and numbers that are the same in the description indicate the same constituent elements. Also, unless otherwise specified, constituent elements that are not essential to the present disclosure are not depicted.

First Exemplary Embodiment

A first exemplary embodiment will be described below with reference to FIGS. 1 to 10. The first exemplary embodiment describes pop-up cradle 200. In the present disclosure, the state in which a part of handset 100 stored in cradle 200 pops up from cradle 200, for example, when being removed by a user is called "pop-up".

[1-1. Configuration]

Figure 1:
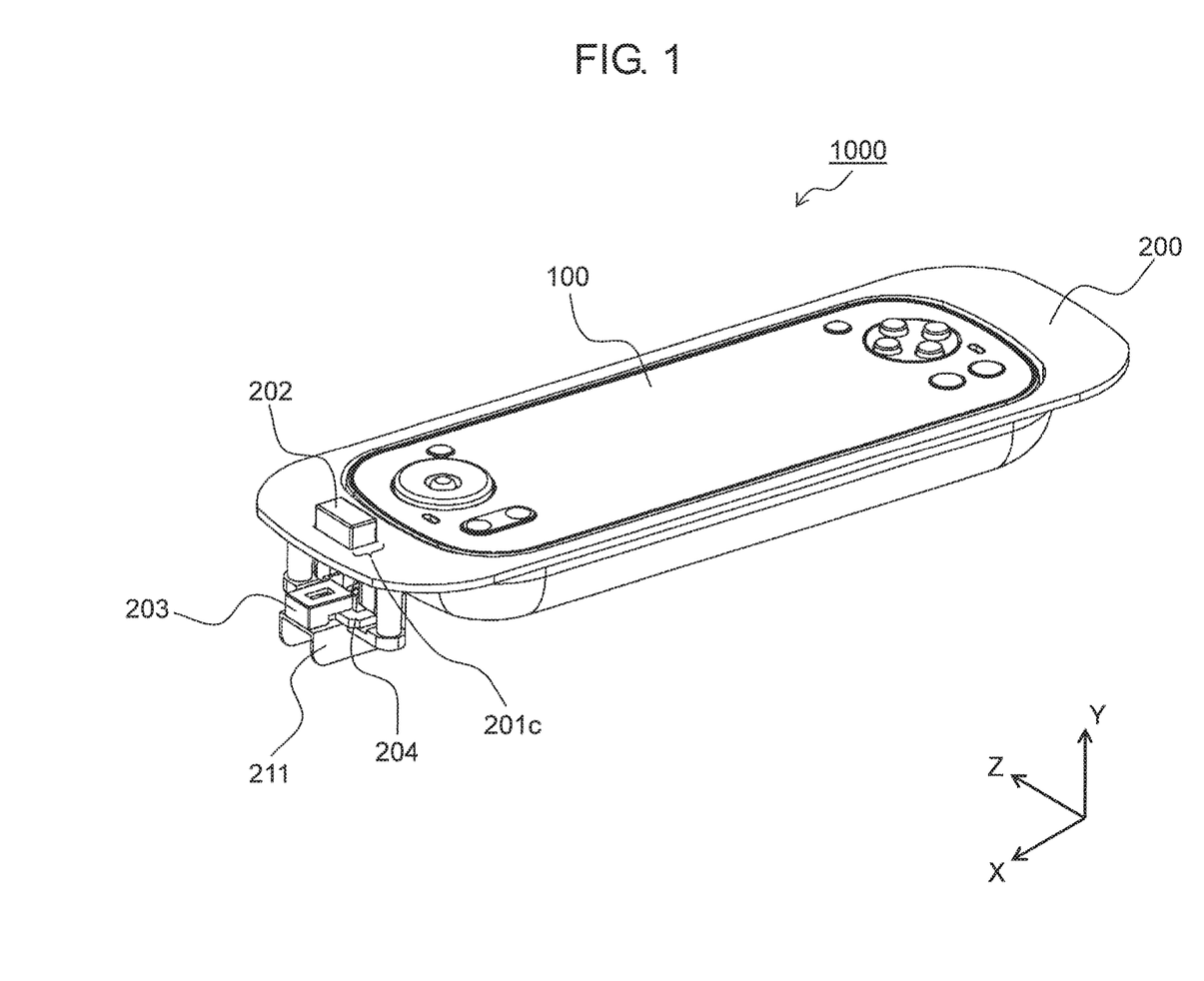
FIG. 1 is a perspective view schematically illustrating one example of an appearance of a cradle storing a handset according to a first exemplary embodiment.

FIG. 1 is a perspective view schematically illustrating one example of an appearance of cradle 200 storing handset 100 according to the first exemplary embodiment.

Cradle set 1000 includes handset 100 and cradle 200. Cradle 200 can removably store handset 100. Cradle set 1000 is one example of a cradle set, cradle 200 is one example of a cradle device, and handset 100 is one example of a terminal device.

Handset 100 is an operation terminal of a computer, for example. Handset 100 is a popularly known operation terminal, so that the detailed description relating to its function will be omitted.

In the present exemplary embodiment, handset 100 may have a function as an operation terminal of a server computer mounted to an aircraft, for example, and cradle 200 storing handset 100 may be installed in a seat of an aircraft. In this configuration example, passengers in an aircraft are able to use various services provided in the aircraft by removing handset 100 from cradle 200 and operating handset 100. The person operating handset 100 is referred to as a "user" below.

Note that this configuration is merely one embodiment. Handset 100 is not particularly limited to an operation terminal of a computer, and the place where cradle 200 is installed is not particularly limited to a seat of an aircraft. Cradle 200 may be installed, in a seat prepared in a movable body such as a bus, a rail car, a watercraft, or the like, or in a public place such as a movie theater, a stage theater, or the like. Cradle 200 may be installed in a place other than a seat. Handset 100 may have a verbal communication function, a communication function, a computation function, or the like, and also may have a display device. Alternatively, a display device installed in a seat may operate in cooperation with handset 100.

Next, structures of handset 100 and cradle 200 will be described.

XYZ axes will be used below for the sake of convenience of the description for each drawing. In the present exemplary embodiment, a longitudinal direction of cradle 200 is specified as an X axis, and an installing direction of button 202 (see FIG. 2) with respect to projections 201b (see FIG. 2) is specified as a positive direction of the X axis. A removal direction of cradle 200 from handset 100 is specified as a Y axis, and a direction in which handset 100 is removed from cradle 200 is specified as a positive direction of the Y axis. A direction perpendicular to the X axis and Y axis is specified as a Z axis, wherein the direction of the Z axis with the positive direction of the X axis specified as the left side and the negative direction in the X axis specified as the right side is specified as a positive direction of the Z axis. It is supposed that the XYZ axes used for the description of handset 100 indicates XYZ axes when handset 100 is stored in cradle 200. A side of cradle 200 (or handset 100) viewed from the positive direction toward the negative direction of the X axis is specified as a front of cradle 200 (or handset 100), and a side of cradle 200 (or handset 100) viewed from the negative direction toward the positive direction of the Z axis is specified as a side face (right side face) of cradle 200 (or handset 100).

Figure 2:
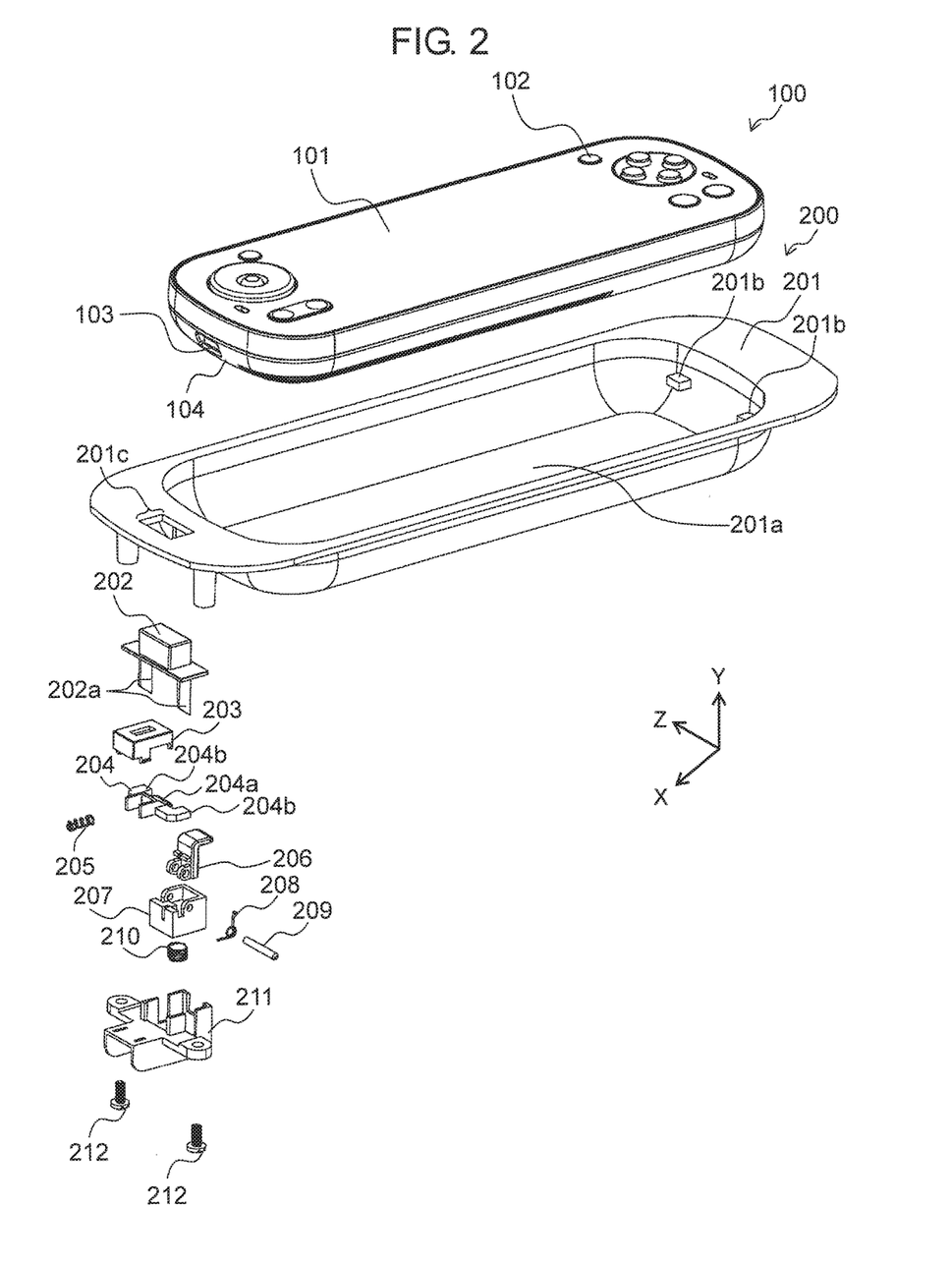
FIG. 2 is an exploded perspective view schematically illustrating an exemplary configuration of the cradle according to the first exemplary embodiment.

FIG. 2 is an exploded perspective view schematically illustrating an exemplary configuration of cradle 200 according to the first exemplary embodiment. FIG. 2 also illustrates one example of an appearance of handset 100.

Figure 3A:
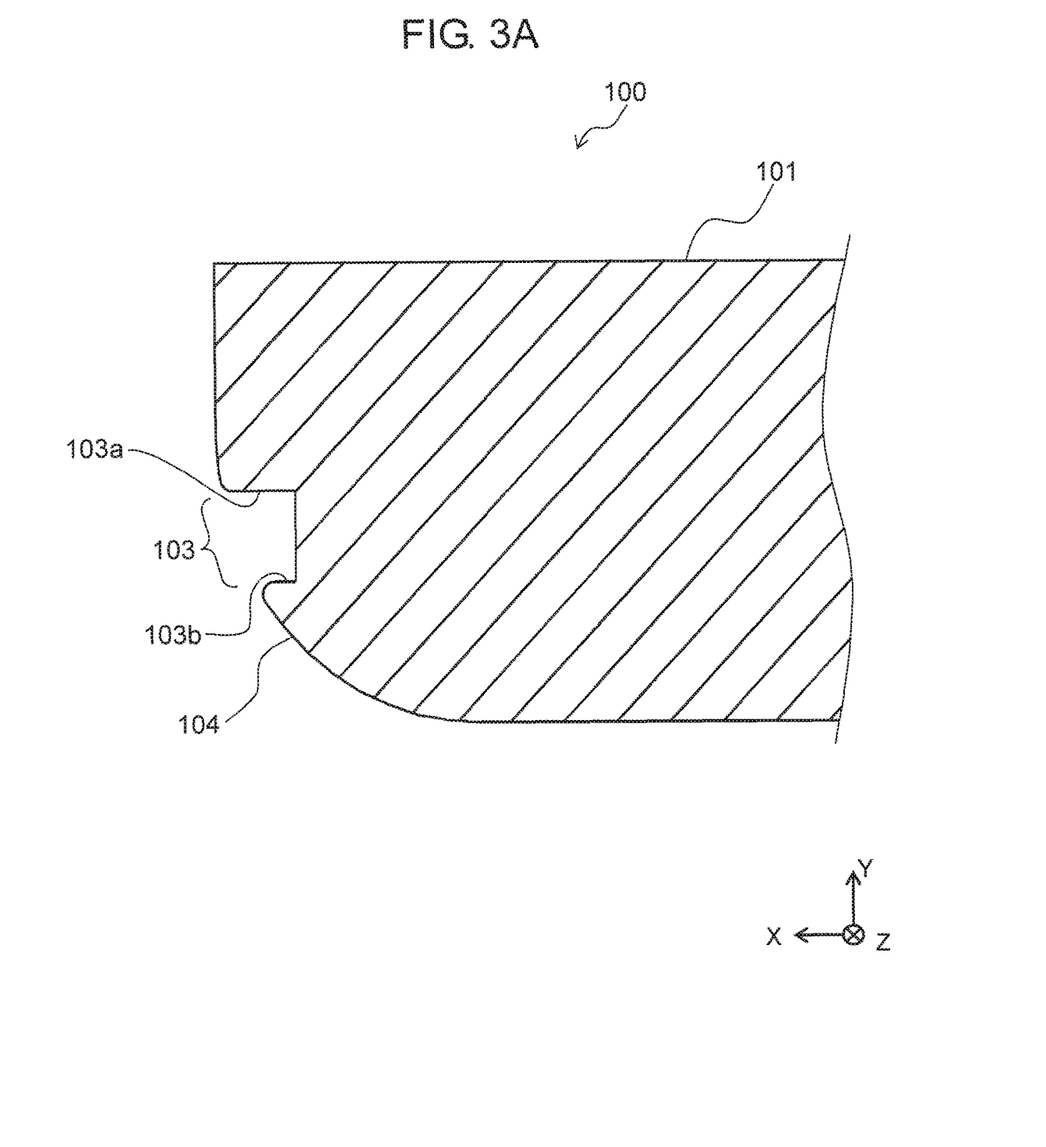
FIG. 3A is a partial sectional view schematically illustrating a part of the handset according to the first exemplary embodiment as being enlarged.

FIG. 3A is a partial sectional view schematically illustrating a part of handset 100 according to the first exemplary embodiment as being enlarged. FIG. 3A is a partial sectional view (a partial sectional view along a line A-A in FIG. 3B) viewed from the side face of handset 100 for schematically illustrating a shape of recess 103 formed on handset 100, FIG. 3A illustrating only an outline of handset 100.

Figure 3B:
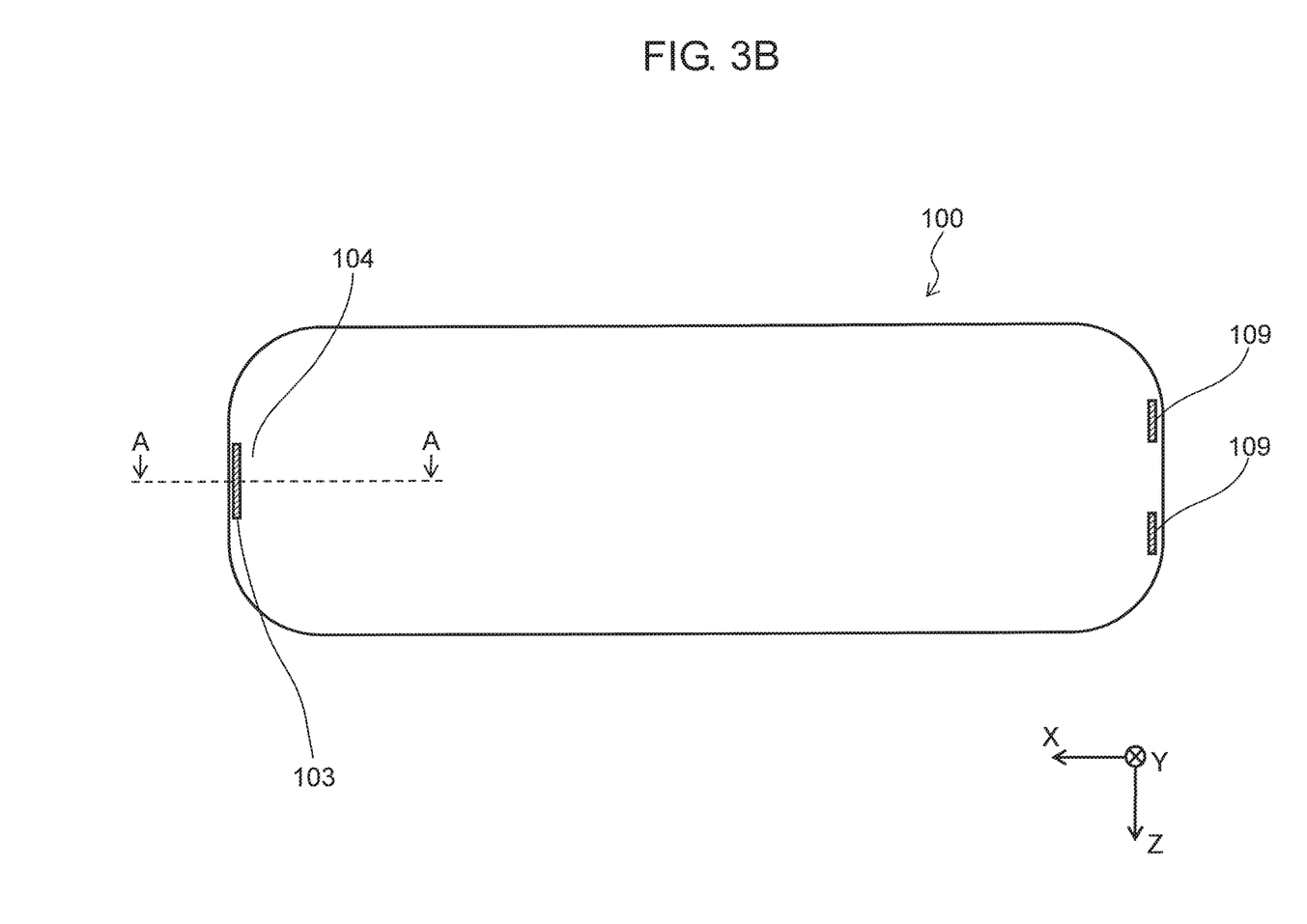
FIG. 3B is a bottom view schematically illustrating one example of the handset according to the first exemplary embodiment.

FIG. 3B is a bottom view schematically illustrating one example of handset 100 according to the first exemplary embodiment. FIG. 3B is a view of handset 100 viewed from a bottom surface for schematically illustrating formation positions of recess 103 and recesses 109 formed on handset 100. Sides at the bottom surface of handset 100 are shorter than sides on the top surface (the surface on which buttons 102 are provided) as viewed from the side face, so that the formation positions of recess 103 and recesses 109 can schematically be illustrated in FIG. 3B.

Firstly, handset 100 will be described.

Handset 100 includes body 101 and a plurality of buttons 102 used by a user operating handset 100. Body 101 is provided with recess 103 and bottom surface 104 which is opposite to a bottom surface of storage portion 201a of cradle 200 when handset 100 is stored in storage portion 201a of cradle 200. Recess 103 is one example of a first recess of a terminal device.

As illustrated in FIGS. 2 and 3A, recess 103 is formed to be dent in the negative direction of the X axis on an end surface (front surface) of handset 100 in the longitudinal direction (positive direction in the X axis).

Recess 103 has face 103a and face 103b formed to be substantially parallel to the bottom surface of storage portion 201a when handset 100 is stored in storage portion 201a of cradle 200. Face 103b of recess 103 is formed on the place in the positive direction of the Y axis from bottom surface 104, and face 103a is formed on the place further in the positive direction of the Y axis from face 103b. Therefore, faces 103a and 103b are opposite to each other. In addition, when handset 100 is stored in storage portion 201a of cradle 200, face 103a faces the bottom surface of storage portion 201a of cradle 200. Notably, the vicinity of face 103b on bottom surface 104 may be formed into a rounded shape as illustrated in FIG. 3A showing one example. Face 103a is one example of a first face, and face 103b is one example of a second face.

Handset 100 is also provided with a pair of recesses 109 (see FIG. 3B) formed to be dent in the positive direction of the X axis so as to be fitted to projections 201b of cradle 200, the pair of recesses 109 being formed on the face (end face of handset 100 in the longitudinal direction (in the negative direction of the X axis) of handset. 100, and hereinafter referred to as a back face) opposite to the front face on which recess 103 is formed. Note that the number of recesses 109 is not limited to two.

Next, cradle 200 will be described.

As illustrated in FIG. 2, cradle 200 includes body 201, button 202, cover 203, movable member 204, spring 205, locking claw 206, pusher 207, spring 208, shaft 209, spring 210, base 211, and screw 212. Button 202 is one example of a button, movable member 204 is one example of a movable member, locking claw 206 is one example of a locker, and pusher 207 is one example of a push up member. Spring 210 is one example of a pop-up spring, and spring 208 is one example of a locking spring. Spring 205 is one example of a spring which biases the movable member toward a later-described third position from a later-described fourth position.

Body 201 includes storage portion 201a capable of storing handset 100 and a pair of projections 201b. Storage portion 201a is one example of a second recess. Note that the number of projections 201b is not limited to two.

Storage portion 201a is formed to be capable of storing a part or all of handset 100 including bottom surface 104 arid recess 103.

Projections 201b are formed on the inner side face (the face opposite to the back face of handset 100 stored in storage portion 201a) at the leading end of storage portion.

201a in the longitudinal direction (in the negative direction of the X axis), and project in the positive direction of the X axis so as to be fitted to recesses 109 formed on the back face of handset 100. Accordingly, when handset 100 is stored in storage portion 201a, projections 201b are fitted to recesses 109 of handset 100. As described below, when handset 100 is stored in storage portion 201a of cradle 200, locking claw 206 is engaged with recess 103 of handset 100. With this, handset 100 is stored in storage portion 201a as being held by projections 201b and locking claw 206.

Body 201 has a button hole 201c at the side opposite to projections 201b (i.e., near recess 103 of handset 100 stored in storage portion 201a). Button hole 201c is formed such that button 202 projects therethrough.

FIG. 1 illustrates button 202 provided through button hole 201c. As illustrated in FIG. 1, button 202 is inserted into button hole 201c from the negative direction toward the positive direction of the Y axis so as to project from button hole 201c. It is configured that a user can push button 202, which projects from button hole 201c, in the negative direction of the Y axis. In the present exemplary embodiment, a position of button 202 projecting from button hole 201c (see FIGS. 1 and 7) is specified as a "first position", and a position of button 202 pressed by a user in the negative direction of the Y axis (see FIGS. 8 to 10) is specified as a "second position". As described above, button 202 mounted through button hole 201c is configured to be movable between the first position and the second position located in the negative direction of the Y axis from the first position. The first position illustrated in the drawings is one example of a first position, and the second position illustrated in the drawings is one example of a second position.

A structure around button 202 will next be described.

Button 202 has a pair of claws 202a. Claws 202a are formed to project from the bottom surface of button 202 in the negative direction of the Y axis, and have slopes in the positive direction of the X axis.

Movable member 204 has holder 204a and a pair of pressed members 204b.

Cover 203 restricts the moving direction of movable member 204. Cover 203 is fixed to base 211.

Movable member 204 is provided in combination with cover 203. The moving direction of movable member 204 is restricted by cover 203. Movable member 204 is configured to be movable in only the X axis direction. Movable member 204 moves in conjunction with button 202. A position of movable member 204 when button 202 is located at the first position is specified as a "third position" (see FIG. 7), and a position of movable member 204 when button 202 is located at the second position is specified as a "fourth position" (see FIGS. 8 to 10). The fourth position is located in the positive direction of the X axis from the third position. As described above, movable member 204 is configured to be movable between the third position and the fourth position in conjunction with button 202. The third position illustrated in the drawings is one example of a third position, and the fourth position illustrated in the drawings is one example of a fourth position.

Specifically, movable member 204 is mounted such that one end thereof is in contact with cover 203 fixed to base 211 and the other end is biased in the negative direction of the X axis (the direction toward the third position from the fourth position) with respect to cover 203 by spring 205 which is in contact with movable member 204. On the other hand, claws 202a of button 202 are in contact with pressed members 204b, and tips of claws 202a are formed into a slope in the positive direction of the X axis so as to press pressed members 204b relative to cover 203 in the positive direction of the X axis when button 202 is pushed in the negative direction of the Y axis.

With this, when a user does not apply force for pushing button 202, movable member 204 is held at the third position by spring 205, and claws 202a of button 202 are pushed up in the positive direction of the Y axis by pressed members 204b of movable member 204, so that button 202 is held at the first position. On the other hand, when button 202 is pressed by the user to be moved from the first position to the second position, claws 202a of button 202 press pressed members 204b of movable member 204 in the positive direction of the X axis, so that movable member 204 moves to the fourth position from the third position.

Although it will be described in detail later, the movable range of pusher 207 is restricted by movable member 204, so that pusher 207 is held at a seventh position, when movable member 204 is located at the third position. When movable member 204 is moved from the third position to the fourth position, pusher 207 moves to an eighth position due to elimination of restriction by movable member 204. When pusher 207 moves to the eighth position, the movable range of movable member 204 is then restricted by pusher 207, so that movable member 204 is held at the fourth position. With this, even after the user stops the motion of pressing button 202, button 202 is held at the second position until pusher 207 is returned to the seventh position from the eighth position. When pusher 207 returns to the seventh position from the eighth position, and movable member 204 returns to the third position from the fourth position with force of biasing movable member 204 in the negative direction of the X axis by spring 205, button 202 returns to the original first position from the second position.

Next, locking claw 206 will be described.

Figure 4:
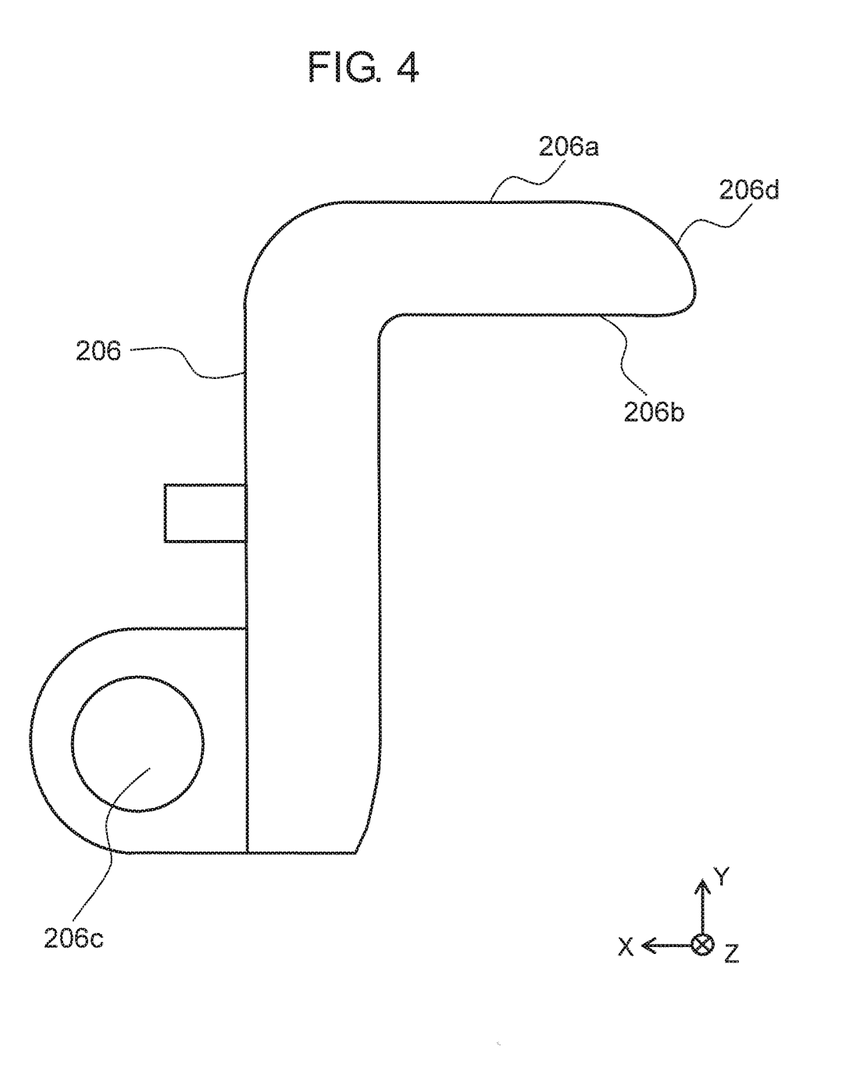
FIG. 4 is a side view schematically illustrating one example of a locking claw according to the first exemplary embodiment.

FIG. 4 is a side view schematically illustrating one example of locking claw 206 according to the first exemplary embodiment.

Locking claw 206 includes face 206a, face 206b, hole 206c, and claw tip 206d.

Locking claw 206 is formed into a shape engageable with recess 103 of handset 100.

Face 206a of locking claw 206 is formed into a shape capable of being in contact with face 103a of recess 103 on handset 100. Face 206b of locking claw 206 is formed into a shape capable of being in contact with face 103b of recess 103 on handset 100. Face 206a is one example of a third face, and face 206b is one example of a fourth face.

Although it will be described in detail later, locking claw 206 and pusher 207 are configured to move in conjunction with each other. At a time when handset 100 popped up from storage portion 201a is to be pushed into storage portion 201a, locking claw 206 moves pusher 207 to the later-described seventh position from the eighth position, because face 206a is pressed by face 103a of handset 100 to be pushed down. When pusher 207 is moved from the seventh position to the eighth position, locking claw 206 is pushed up by pusher 207. In this case, locking claw 206 pushes up handset 100 in the positive direction of the Y axis due to the contact between face 206a and face 103a of handset 100, thereby popping up handset 100 from storage portion 201a (see FIG. 8).

Although it will be described in detail later, locking claw 206 prevents handset 100 from falling from storage portion 201a (see FIG. 7) with the contact between face 206b and face 103b of handset 100 stored in storage portion 201a or popped up from storage portion 201a. Specifically, locking claw 206 located at the fifth position holds handset 100 stored in storage portion 201a or popped up from storage portion 201a so as not to fall from storage portion 201a.

When handset 100 is stored in storage portion 201a, face 103a of recess 103 and face 206a of locking claw 206 may be in contact with each other or may not be in contact with each other. When handset 100 is stored in storage portion 201a, face 103b of recess 103 and face 206b of locking claw 206 may be in contact with each other or may not be in contact with each other.

Shaft 209 is inserted into hole 206c as described later.

Claw tip 206d is formed at the position of connecting face 206a and face 206b. As illustrated in FIG. 4 showing one example, claw tip 206d may be formed into a rounded shape in the vicinity of face 206a.

The relationship between pusher 207 and locking claw 206 will be described next.

Figure 5:
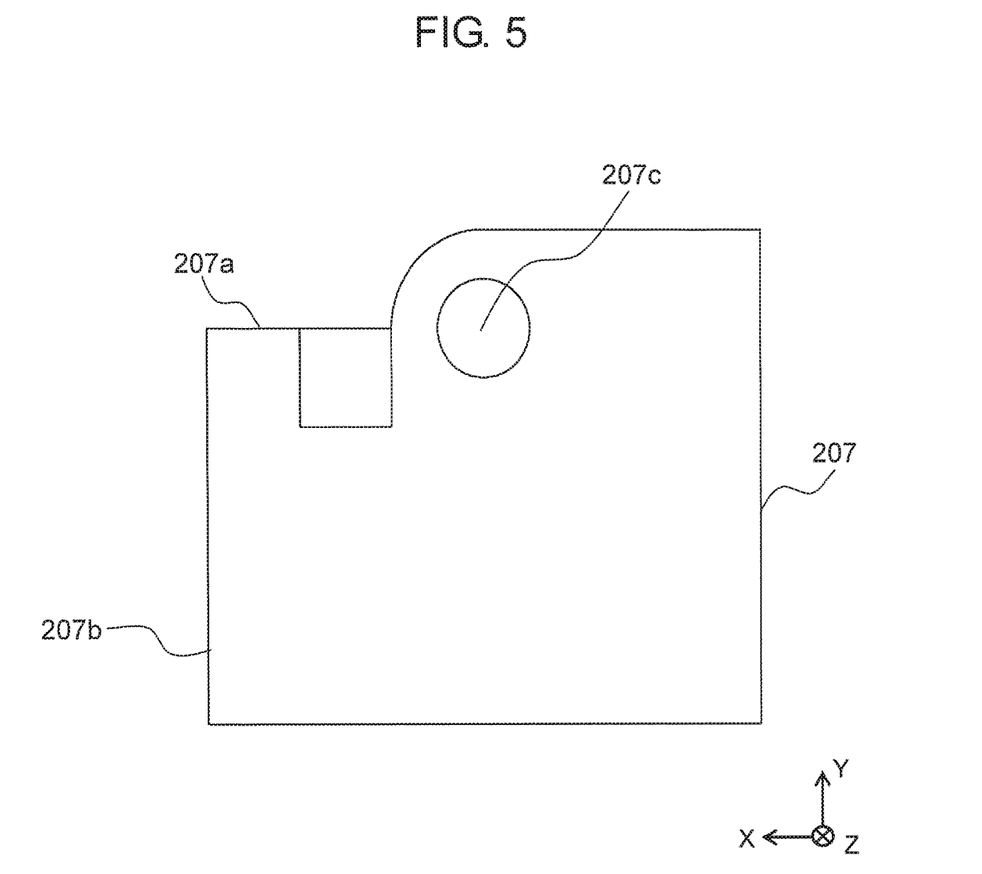
FIG. 5 is a side view schematically illustrating one example of a pusher according to the first exemplary embodiment.

FIG. 5 is a side view schematically illustrating one example of pusher 207 according to the first exemplary embodiment.

Pusher 207 includes face 207a, face 207b, and hole 207c. Face 207a is formed to direct the positive direction of the Y axis, and face 207b is formed to direct the positive direction of the X axis. Face 207a and face 207b are both formed into a shape capable of being in contact with holder 204a of movable member 204.

Figure 8:
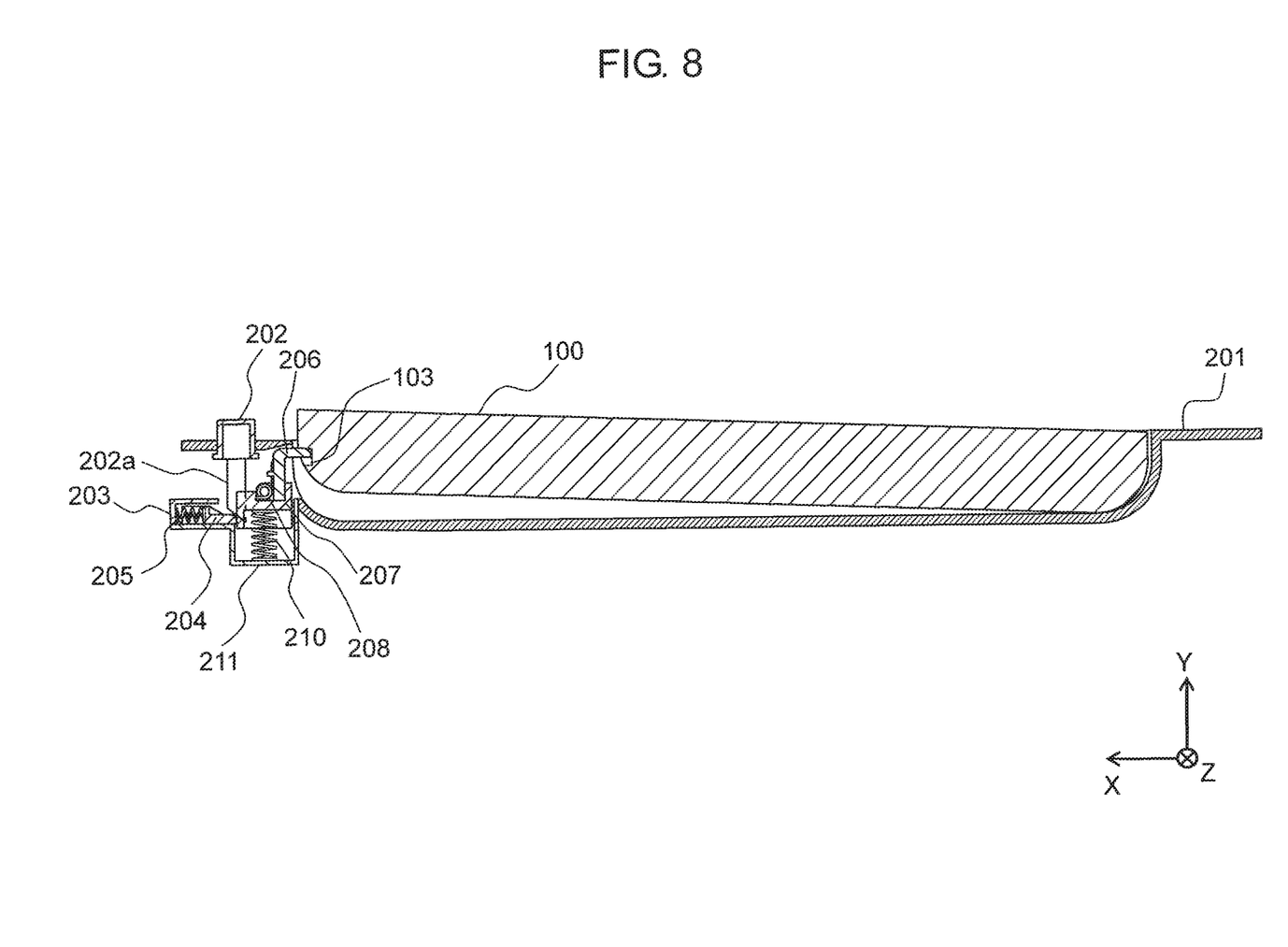
FIG. 8 is a sectional view schematically illustrating one example of a state in which the handset is popped up from the cradle according to the first exemplary embodiment.
Figure 9:
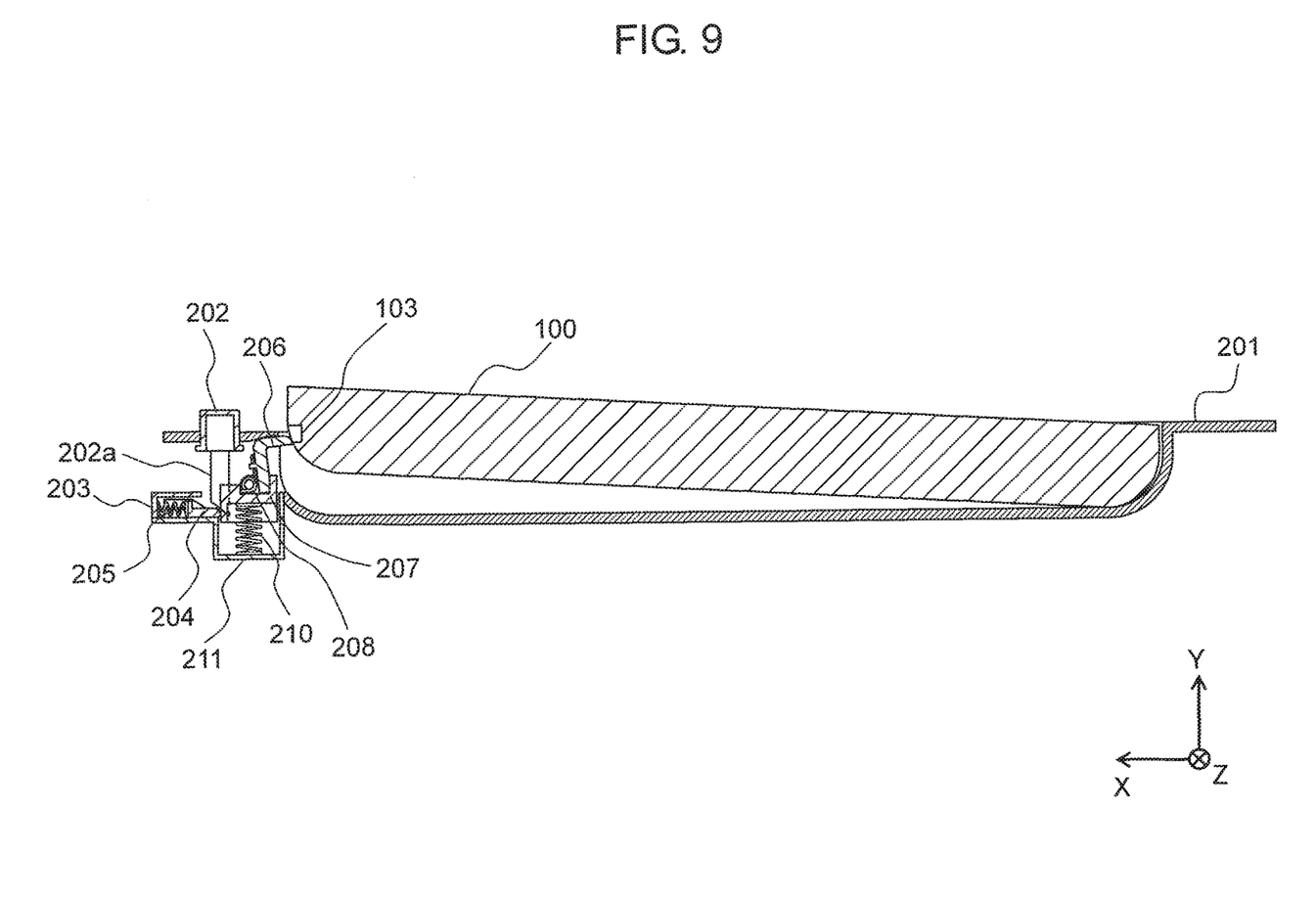
FIG. 9 is a sectional view schematically illustrating one example of a state in which the locking claw is located on a boundary between a recess and a bottom surface according to the first exemplary embodiment.

Locking claw 206 is configured to be movable between a fifth position (see FIGS. 7 and 8) and the sixth position (see FIG. 9). In the present exemplary embodiment, a position of locking claw 206 when locking claw 206 is engaged with recess 103 of handset 100 which is stored in storage portion 201a or popped up from storage portion 201a is specified as the "fifth position" (see FIGS. 7 and 8), and a position of locking claw 206 when locking claw 206 is released from the engagement with recess 103 of handset 100 is specified as the "sixth position" (see FIG. 9). The fifth position is one example of a locking position, and the sixth position is one example of a release position.

Locking claw 206 is mounted such that hole 206c of locking claw 206 and hole 207c of pusher 207 are overlapped with each other. In this case, spring 208 is disposed between locking claw 206 and pusher 207. Then, shaft 209 is inserted into hole 206c of locking claw 206, hole 207c of pusher 207, and spring 208, whereby locking claw 206 and pusher 207 are connected to each other. With this, pusher 207 supports locking claw 206 so as to be capable of swinging about shaft 209 parallel to the Z axis, whereby locking claw 206 can move between the fifth position and the sixth position. Locking claw 206 is also biased in the direction toward the fifth position from the sixth position with spring 208. Locking claw 206 and pusher 207 move in conjunction with each other.

When handset 100 is stored in storage portion 201a (see FIG. 7) or when handset 100 is popped up from storage portion 201a (see FIG. 8), recess 103 of handset 100 is engaged with locking claw 206 located at the fifth position, whereby the falling of handset 100 from storage portion 201a is prevented. When locking claw 206 moves from the fifth position to the sixth position, recess 103 of handset 100 is released from locking claw 206, so that the user can remove handset 100 from cradle 200.

Notably, spring 208 biases locking claw 206 in the direction toward the fifth position from the sixth position. Therefore, when locking claw 206 is engaged with recess 103, or when external force is not applied to locking claw 206, locking claw 206 is pressed by spring 208 and held at the fifth position (see FIGS. 7, 8, and 10).

Pusher 207 is configured to be movable between the seventh position and the eighth position. In the present exemplary embodiment, a position of pusher 207 when handset 100 is stored in storage portion 201a is specified as the "seventh position" (see FIG. 7). A position of pusher 207 when handset 100 is popped up from storage portion 201a or when handset 100 is removed from storage portion 201a is specified as the "eighth position" (see FIGS. 8 to 10). The eighth position is located in the positive direction of the Y axis from the seventh position. The seventh position is one example of a storage position, and the eighth position is one example of a pop-up position.

The eighth position (see FIG. 10) when handset; 100 is removed from storage portion 201a may be located in the positive direction of the Y axis from the eighth position (see FIG. 8) when handset 100 is popped up from storage portion 201a.

Spring 210 is disposed between base 211 and pusher 207. One end of spring 210 is in contact with base 211 and the other end is in contact with pusher 207. Pusher 207 is biased in the positive direction of the Y axis (the direction from the seventh position toward the eighth position) relative to base 211 by spring 210.

When pusher 207 moves from the eighth position to the seventh position, movable member 204 is biased by spring 205 to be moved to the third position from the fourth position, and is held at the third position. In this case, pusher 207 is biased in the positive direction of the Y axis by spring 210. However, the movable range of pusher 207 is restricted due to the contact between face 207a of pusher 207 and holder 204a of movable member 204. With this, pusher 207 is held at the seventh position (see FIG. 7). Button 202 is held at the first position, since movable member 204 is held at the third position.

When button 202 is pushed by the user to be moved from the first position to the second position, and movable member 204 is moved from the third position to the fourth position, face 207a of pusher 207 is released from holder 204a of movable member 204 holding pusher 207 at the seventh position. With this, pusher 207 is biased by spring 210 to be moved from the seventh position to the eighth position. When the user stops the pushing operation of button 202, movable member 204 is biased in the negative direction of the X axis by spring 205. However, the movable range of movable member 204 is then restricted due to the contact between holder 204a of movable member 204 and face 207b of pusher 207 located at the eighth position. With this, movable member 204 is held at the fourth position (see FIG. 8). Button 202 is held at the second position, since movable member 204 is held at the fourth position.

Base 211 is fixed to body 201 of cradle 200 with screw 212.

[1-2. Operation]

[1-2-1. Handset Removing Operation]

Next, the operation of removing handset 100 from cradle 200 will be described with reference to FIGS. 6 to 10.

Figure 6:
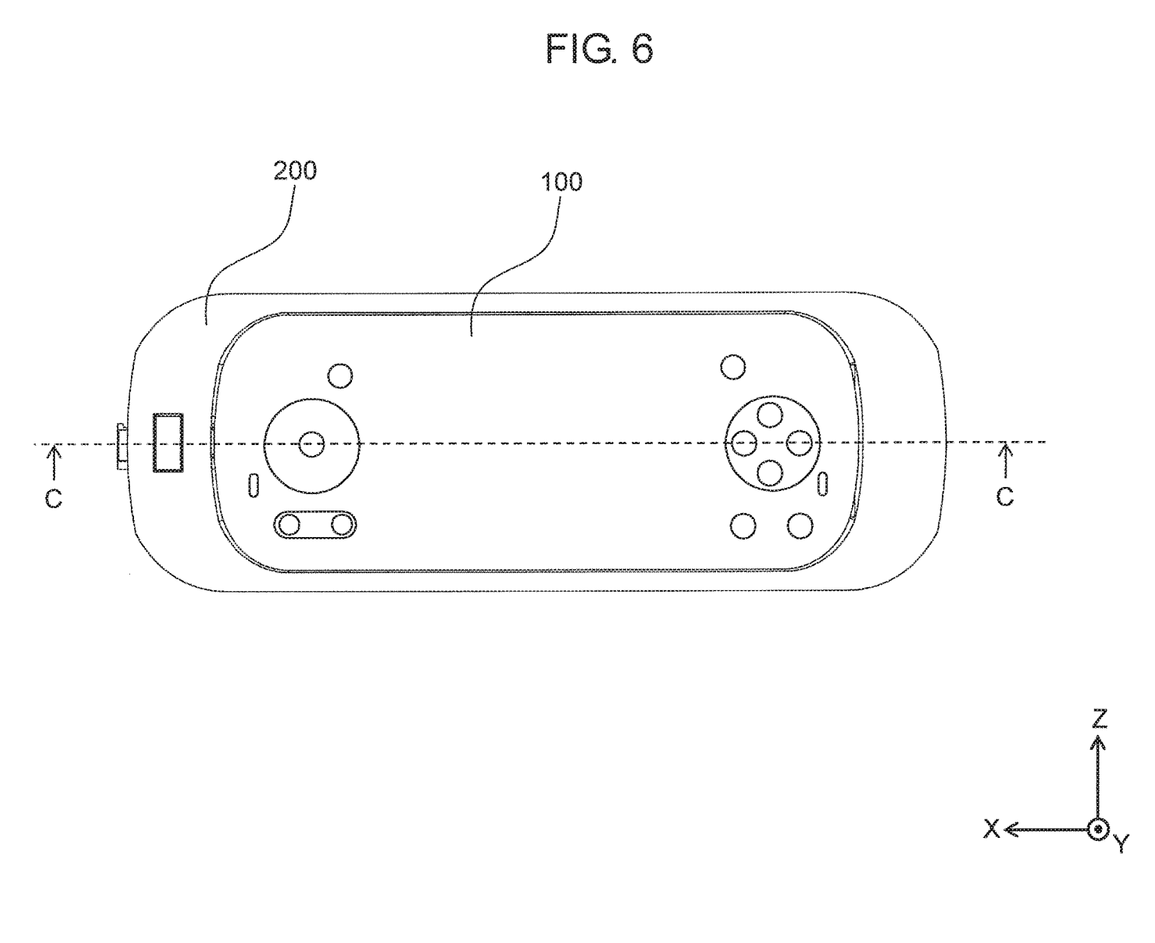
FIG. 6 is a plan view schematically illustrating one example of a state in which the handset is stored in the cradle according to the first exemplary embodiment.

FIG. 6 is a plan view schematically illustrating one example of a state in which handset 100 is stored in cradle 200 according to the first exemplary embodiment. FIG. 6 is a plan view of cradle 200 storing handset 100 viewed from the positive direction toward the negative direction of the Y axis.

Figure 7:
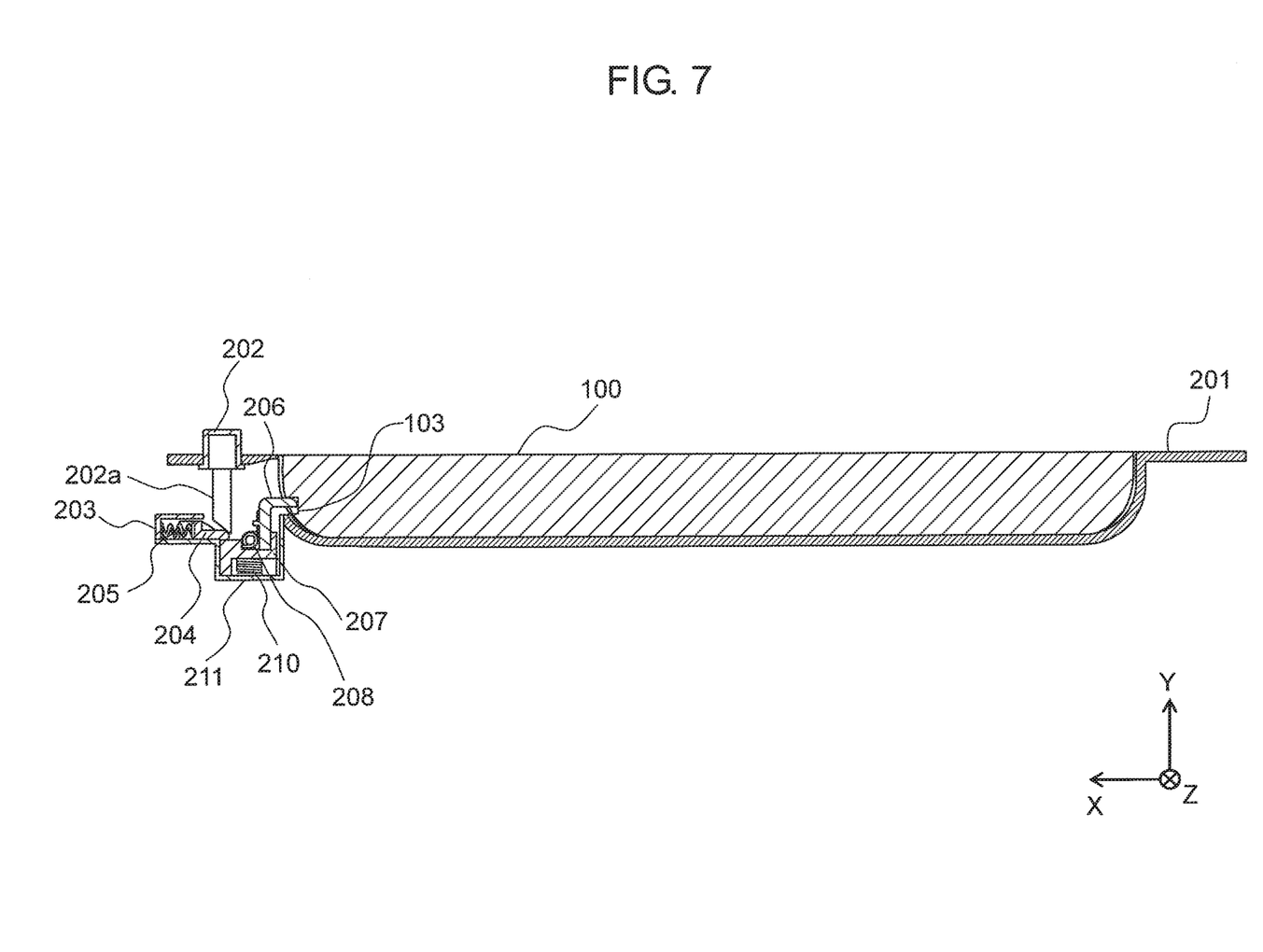
FIG. 7 is a sectional view schematically illustrating one example of a state in which the handset is stored in the cradle according to the first exemplary embodiment.

FIG. 7 is a sectional view schematically illustrating one example of a state in which handset 100 is stored in cradle 200 according to the first exemplary embodiment.

FIG. 8 is a sectional view schematically illustrating one example of a state in which handset 100 is popped up from cradle 200 according to the first exemplary embodiment.

FIG. 9 is a sectional view schematically illustrating one example of a state in which locking claw 206 is located on the boundary between recess 103 and bottom surface 104 according to the first exemplary embodiment.

Figure 10:
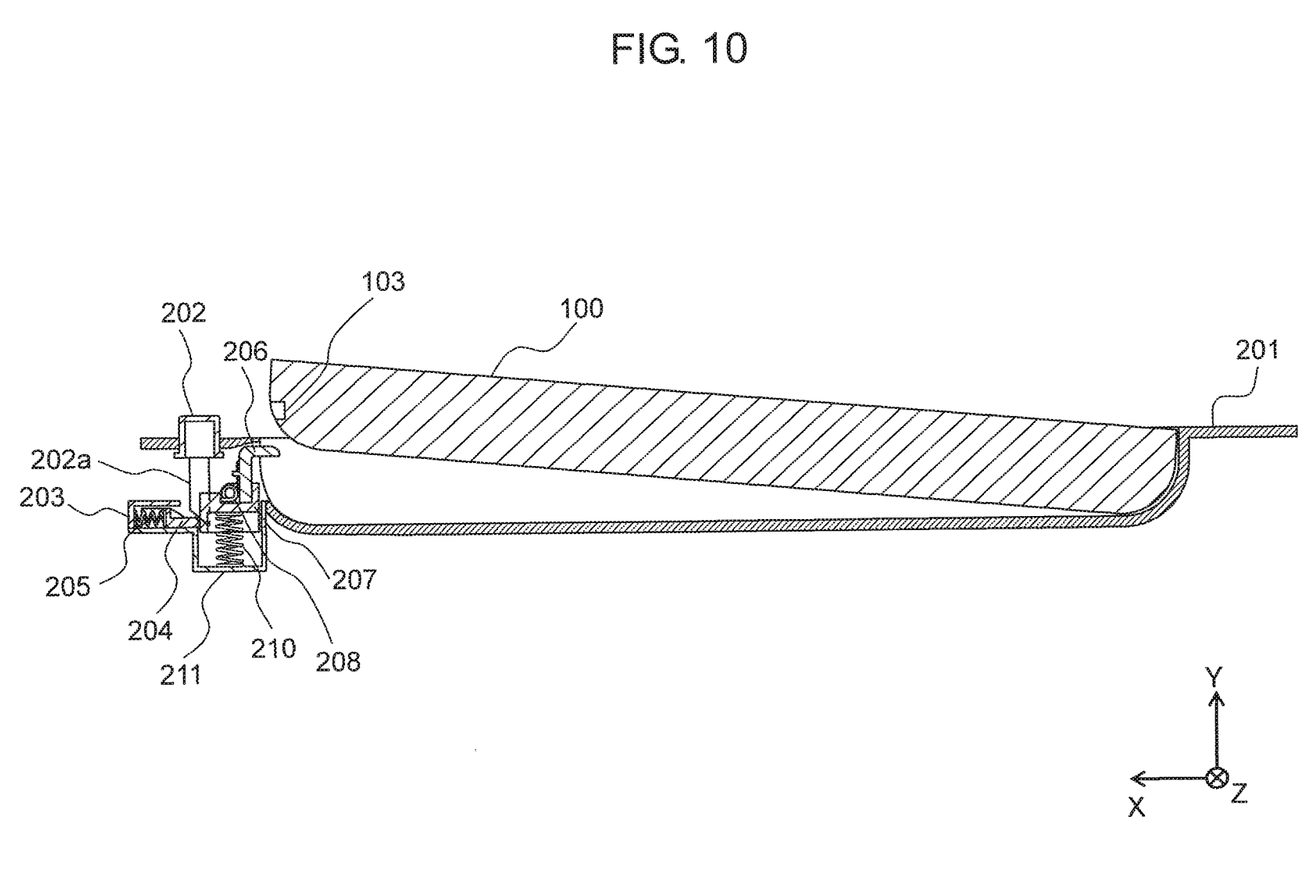
FIG. 10 is a sectional view schematically illustrating one example of a state in which the handset is removed from the cradle according to the first exemplary embodiment.

FIG. 10 is a sectional view illustrating one example of a state in which handset 100 is removed from cradle 200 according to the first exemplary embodiment.

Notably, FIGS. 7 to 10 are sectional views taken along line C-C in FIG. 6, However, FIGS. 7 to 10 illustrate only an outline as for handset 100, and side views as for spring 205 and spring 210.

Firstly, the state in which handset 100 is stored in storage portion 201a of cradle 200 will be described.

As illustrated in FIG. 7, when handset 100 is stored in storage portion 201a of cradle 200, locking claw 206 of cradle 200 is pressed in the negative direction of the X axis by spring 208 to be held at the fifth position, and is engaged with recess 103 of handset 100. Movable member 204 is pressed in the negative direction of the X axis by spring 205 to be held at the third position, and holds pusher 207 at the seventh position. Claws 202a are pushed up in the positive direction of the Y axis by pressed members 204b of movable member 204, so that button 202 is held at the first position. In the present exemplary embodiment, handset 100 is stored in storage portion 201a of cradle 200 with this state, i.e., with the state in which falling of handset 100 from cradle 200 is prevented by locking claw 206. A position of handset 100 when being stored in storage portion 201a of cradle 200 is specified as a "ninth position".

Next, the state in which handset 100 is popped up from storage portion 201a of cradle 200 will be described.

As illustrated in FIG. 8, when button 202 of cradle 200 is pushed in the negative direction of the Y axis by the user (not illustrated) to be moved from the first position to the second position, pressed members 204b of movable member 204 that are in contact with claws 202a of button 202 are pressed by claws 202a moving in the negative direction of the Y axis, and move in the positive direction of the X axis. With this, movable member 204 moves from the third position to the fourth position, and pusher 207 is released from holder 204a of movable member 204, which is in contact with face 207a of pusher 207 to restrict the movable range of pusher 207. Then, pusher 207 is biased in the positive direction of the Y axis by spring 210 to be moved from the seventh position to the eighth position.

In this case, locking claw 206 also moves in the positive direction of the Y axis in conjunction with the movement of pusher 207. Locking claw 206 then pushes up face 103a of recess 103 on handset 100 in the positive direction of the Y axis, face 103a being in contact with face 206a of locking claw 206. With this, handset 100 is in the state of being pushed up from storage portion 201a of cradle 200 as illustrated in FIG. 8. A position of handset 100 in this case is specified as a "tenth position". The tenth position is located in the positive direction of the Y axis from the ninth position. The state in which handset 100 is located on the tenth position is "the state in which handset 100 is popped up". As described above, when the user pushes button 202 from the first position to the second position, handset 100 stored in storage portion 201a of cradle 200 is popped up from the ninth position to the tenth position.

As illustrated in FIG. 8, when handset 100 is popped up from storage portion 201a of cradle 200 to be located at the tenth position, locking claw 206 of cradle 200 is also pressed in the negative direction of the X axis by spring 208 to be held at the fifth position, and is engaged with recess 103 of handset 100. Therefore, handset 100 is popped up from storage portion 201a of cradle 200 with this state, i.e., with the state in which failing of handset 100 from cradle 200 is prevented by locking claw 206.

When pusher 207 moves to the eighth position from the seventh position, holder 204a of movable member 204 is then in contact with face 207b of pusher 207 located at the eighth position, whereby the movable range of movable member 204 is restricted. With this, movable member 204 becomes to be state of being held at the fourth position. Since movable member 204 is held at the fourth position, pressed members 204b, which are in contact with claws 202a of button 202 to hold button 202 at the first position, of movable member 204 also move in the positive direction of the X axis and keep this state. With this, button 202 is held at the second, position even after the user stops the pushing operation of button 202.

Next, the state in which handset 100 is removed from cradle 200 will be described.

As illustrated in FIG. 9, when the user (not illustrated) picks up handset 100, which has been popped up from storage portion 201a of cradle 200, in the positive direction of the Y axis, face 103b of recess 103 on handset 100 and face 206b of locking claw 206 of cradle 200 are firstly brought in contact with each other. When the user further picks up handset 100 in the positive direction of the Y axis, face 103b of recess 103 pushes up face 206b of locking claw 206 in the positive direction of the Y axis. With this, locking claw 206 swings about shaft 209 inserted into hole 206c, thereby moving to the sixth position from the fifth position. Claw tip 206d of locking claw 206 then moves to the vicinity of the boundary between recess 103 and bottom surface 104 from recess 103 on handset 100. In this way, recess 103 on handset 100 is released from the engagement with locking claw 206, whereby handset 100 is in the state of being removable from cradle 200. Notably, FIG. 9 illustrates the state just after recess 103 on handset 100 is released from the engagement with locking claw 206.

When the user further picks up handset 100 in the positive direction of the Y axis, handset 100 can be removed from cradle 200 as illustrated in FIG. 10. In this case, locking claw 206 is biased by spring 208 to return to the fifth position from the sixth position.

[1-2-2. Handset Storing Operation]

Next, the operation of storing handset 100 in storage portion 201a of cradle 200 will be described with reference to FIGS. 7 to 10.

When the user stores handset 100 into storage portion 201a of cradle 200, firstly as illustrated in FIG. 10, as the end (the end opposite to the end on the front on which recess 103 is formed, and hereinafter also referred to as backside end) of handset 100 in the negative direction of the X axis is inserted into storage portion 201a of cradle 200, and recesses 109 formed on the back surface of handset 100 are fitted to projections 201b of cradle 200.

Then, when the end (the end on the front surface on which recess 103 is formed) in the positive direction of the X axis of handset 100 is pushed into storage portion 201a of cradle 200 (in the negative direction of the Y axis) by the user, claw tip 206d of locking claw 206 located at the fifth position is brought into contact with bottom surface 104 of handset 100.

When handset 100 is further pushed into storage portion 201a of cradle 200 by the user, claw tip 206d of locking claw 206 is pressed against bottom surface 104 of handset 100. The vicinity of face 103b of bottom surface 104 of handset 100 is formed into a rounded shape, and claw tip 206d is also formed into a rounded shape. Therefore, a part of downward force (in the negative direction of the Y axis) with the pressing acts as force for swinging locking claw 206 toward the sixth position from the fifth position. With this, locking claw 206 swings. In this way, locking claw 206 moves to the sixth position from the fifth position, and claw tip 206d of locking claw 206 moves to the boundary between recess 103 on handset 100 and bottom surface 104 as illustrated in FIG. 9. Notably, FIG. 9 illustrates the state just before locking claw 206 of cradle 200 and recess 103 on handset 100 are engaged with each other.

When handset 100 is further pushed into storage portion 201a of cradle 200 by the user, recess 103 on handset 100 moves to claw tip 206d of locking claw 206. Locking claw 206 released from the contact with bottom surface 104 of handset 100 is biased by spring 208, and swings to move to the fifth position from the sixth position. In this way, locking claw 206 of cradle 200 and recess 103 on handset 100 are engaged with each other as illustrated in FIG. 8.

When handset 100 is further pushed into storage portion 201a of cradle 200 by the user, face 103a, which is in contact with face 206a of locking claw 206, of recess 103 on handset 100 presses locking claw 206 in the negative direction of the Y axis. With this, locking claw 206 moves in the negative direction of the Y axis, and pusher 207 also moves in the negative direction of the Y axis in conjunction with the movement of locking claw 206. In this way, pusher 207 moves to the seventh position from the eighth position.

When pusher 207 moves to the seventh position, movable member 204 is released from face 207b of pusher 207, which is in contact with holder 204a of movable member 204 to restrict the movable range of movable member 204. Then, movable member 204 is biased in the negative direction of the X axis by spring 205 to be moved to the third position from the fourth position, and is held at the third position.

When the user stops the operation of pushing handset 100, pusher 207 is biased in the positive direction of the Y axis by spring 210. However, holder 204a of movable member 204 is in contact with face 207a of pusher 207 due to the movement of movable member 204 from the fourth position to the third position, whereby the movable range of pusher 207 is restricted. With this, pusher 207 becomes to be state of being held at the seventh position.

When movable member 204 moves to the third position from the fourth position, claws 202a of button 202 that are in contact with pressed members 204b of movable member 204 are pressed by pressed members 204b moving in the negative direction of the X axis, thereby moving in the positive direction of the Y axis. With this, button 202 moves to the first position from the second position.

In this way, handset 100 is in the state of being stored in storage portion 201a of cradle 200 as illustrated in FIG. 7.

It is to be noted that each of upper, lower, left, and right directions and each of front, bottom, side, and back surfaces as shown in the present exemplary embodiment are not absolute but relative. In addition, the directions described in each of the above operations are rough, and not strict.

[1-3. Effects, and the Like]

As described above, in the present exemplary embodiment, a cradle device is configured to removably store a terminal device having a first recess. This cradle device includes a second recess, a locker, and a push up member. The second recess is capable of storing at least a part of the terminal device, the part including the first recess. The locker is formed to be engageable with the first recess of the terminal device, and the locker being engaged with the first recess, which is stored in the second recess, of the terminal device to hold the terminal device. The push up member is connected to the locker, and pushes up the locker engaged with the first recess to push up the terminal device from the second recess with the state in which the terminal device is held by the locker.

In the present exemplary embodiment, a cradle set includes a terminal device having a first recess and a cradle device that removably stores the terminal device. The cradle device includes a second recess, a locker, and a push up member. The second recess is capable of storing at least a part of the terminal device, the part including the first recess. The locker is formed to be engageable with the first recess of the terminal device, and the locker being engaged with the first recess, which is stored in the second recess, of the terminal device to hold the terminal device. The push up member is connected to the locker, and pushes up the locker engaged with the first recess to push up the terminal device from the second recess with the state in which the terminal device is held by the locker.

Notably, cradle 200 is one example of the cradle device. Handset 100 is one example of the terminal device. Cradle set 1000 is one example of the cradle set. Recess 103 is one example of the first recess of the terminal device, Storage portion 201a is one example of a second recess. Locking claw 206 is one example of the locker. Pusher. 207 is one example of the push up member.

In the cradle device (e.g., cradle 200) thus configured, the terminal device (e.g., handset 100) keeps the engagement between the locker (e.g., locking claw 206) and the first recess (e.g., recess 103) of the terminal device, when being popped up from the cradle device as well as when being stored in the cradle device. Accordingly, the falling of the terminal device from the cradle device is prevented. Consequently, when the user removes the terminal device stored in the cradle device even in state that the terminal device is popped up from the cradle device in order to allow the user to easily remove the terminal device, the locker holds the terminal device, whereby the falling of the terminal device from the cradle device is prevented, and the user can stably remove the terminal device.

While a cradle device according to the conventional art has relatively complicated structure, the cradle device according to the present disclosure can be implemented with relatively a simple structure.

In the cradle device, the push up member may be pushed down by the locker which is pressed by the terminal device as being engaged with the first recess of the terminal device, at a time when the terminal device is to be stored in the second recess.

In the cradle device, the push up member may be movable between a storage position where the terminal device is stored in the second recess and a pop-up position where the terminal device is pushed up from the second recess. The locker may be movable between a locking position where the locker is engaged with the first recess of the terminal device and a release position where the locker is released from the engagement with the first recess.

Notably, the fifth position is one example of the locking position. The sixth position is one example of the release position. The seventh position is one example of the storage position. The eighth position is one example of the pop-up position.

In the cradle device, the terminal device, which has a first recess having a first face opposite to a bottom surface of the second recess when being stored in the second recess and a second face opposite to the first face, may be stored in the second recess. In the cradle device, the locker may have a third face and a fourth face. The third face may be capable of being in contact with the first face of the first recess at the locking position, wherein the third face may be brought into contact with the first face to press the first face at a time when the terminal device is to be pushed up from the second recess, and may be in contact with the first face to be pressed by the first face at a time when the terminal device is to be stored in the second recess. The fourth face may be capable of being in contact with the second face of the first recess at the locking position, wherein the fourth face may be in contact with the second face of the first recess to hold the terminal device, when the terminal device is stored in the second recess and when the terminal device is pushed up from the second recess.

Notably, face 103a is one example of the first face. Face 103b is one example of the second face. Face 206a is one example of the third face. Face 206b is one example of the fourth face.

The cradle device may also have a button that is movable between a first position and a second position, and a movable member. The movable member may be movable between a third position where the push up member is held at the storage position and a fourth position which allows the push up member to move from the storage position to the pop-up position, and may move from the third position to the fourth position by being pressed by the button moving from the first position to the second position.

Notably, button 202 is one example of the button. Movable member 204 is one example of the movable member. The first position illustrated in the exemplary embodiment is one example of the first position, and the second position illustrated in the exemplary embodiment is one example of the second position. The third position illustrated in the exemplary embodiment is one example of the third position, and the fourth position illustrated in the exemplary embodiment is one example of the fourth position.

In the cradle device, the movable member may be held at the fourth position by the push up member located at the pop-up position. The movable member may also be moved from the fourth position to the third position due to the movement of the push up member from the pop-up position to the storage position. The movable member may press the button to move the button to the first position from the second position, when moving from the fourth position to the third position.

The cradle device may include a pop-up spring that biases the push up member from the storage position toward the pop-up position.

Spring 210 is one example of the pop-up spring.

The cradle device may include a locking spring that biases the locker from the release position toward the locking position.

Notably, spring 208 is one example of the locking spring.

The cradle device may include a spring that biases the movable member from the fourth position to the third position.

Notably, spring 205 is one example of the spring which biases the movable member toward the third position from the fourth position.

Other Exemplary Embodiments

As described above, the first exemplary embodiment has been described as an example of technology disclosed in the present application. However, the technology according to the present disclosure is not limited thereto, and is applicable to embodiments to which modifications, replacements, additions, omissions, etc. are made. Furthermore, the components described in the above first exemplary embodiment may be combined to one another to form a new embodiment.

The other exemplary embodiments will be described below.

The first exemplary embodiment describes the exemplary configuration in which a cable is not provided between handset 100 and cradle 200. However, cradle set 1000 may include a cable connecting handset 100 and cradle 200 to each other. For example, a cable connected to cradle 200 may be connected to the backside end of handset 100. Cradle 200 may have a cable storage opening for storing a cable at a position in storage portion 201a corresponding to a connection portion between the cable and handset 100 when handset 100 is stored in storage portion 201a of handset 100.

The first exemplary embodiment describes the exemplary configuration in which handset 100 is held by cradle 200 due to the engagement between recess 103 on handset 100 and locking claw 206 of cradle 200 and the fitting between recesses 109 formed on the back surface of handset 100 and projections 201b of cradle 200, when handset 100 is stored in storage portion 201a of cradle 200 and when handset 100 is popped up from storage portion 201a. However, cradle 200 may not have projections 201b, and handset 100 may not have recesses 109 on the back surface.

For example, in the above-described exemplary configuration in which handset 100 includes a cable connected to cradle 200 and cradle 200 has a cable storage opening in storage portion 201a, the cable is stored in the cable storage opening when handset 100 is stored in storage portion 201a of cradle 200, by which one end of handset 100 is held by cradle 200. Therefore, the able stored in the cable storage opening and the connection portion between handset 100 and the cable becomes a substitute of the fitting between recesses 109 formed on the back surface of handset 100 and projections 201b of cradle 200. Accordingly, with this configuration, cradle 200 may not have projection 201b, and handset 100 may not have recess 109 on the back surface.

The present exemplary embodiment describes the configuration in which locking claw 206 and pusher 207 are coupled with shaft 209. However, locking claw 206 and pusher 207 may integrally be formed.

The present exemplary embodiment describes the exemplary configuration in which the vicinity of face 103b of bottom surface 104 of handset 100 is formed into a rounded shape, and claw tip 206d of locking claw 206 is formed into a rounded shape. However, the present disclosure is not particularly limited thereto. This configuration is made for changing a part of downward force (in the negative direction of the Y axis) applied to press claw tip 206d of locking claw 206 by bottom surface 104 of handset 100 into force for swinging locking claw 206 toward the sixth position from the fifth position, when handset 100 is pushed into storage portion 201a of cradle 200 by the user. Accordingly, if this operation can be implemented, bottom surface 104 of handset 100 and claw tip 206d of locking claw 206 may have any shape. For example, the operation similar to the above operation can be implemented with the configuration in which at least one of claw tip 206d of locking claw 206 and bottom surface 104 of handset 100, which are first brought into contact with storage portion 201a when handset 100 is stored in storage portion 201a of cradle 200, is formed obliquely relative to the Y axis.

Notably, the shapes illustrated in the drawings are only illustrative, and each component is not limited to have the shape illustrated in the drawings.

The exemplary embodiments described above are to illustrate the technology according to the present disclosure, and various modifications, substitutions, additions, omissions, and the like can be made within the scope of the appended claims or the equivalents thereof.

The present disclosure is applicable to a cradle device that removably holds a terminal device. Specifically, the present disclosure is applicable to a cradle device installed in a seat in an aircraft, a rail car, a watercraft, a bus, and the like.

What is claimed is:

1. A cradle device that removably stores a terminal device having a first recess, the cradle device comprising:
    a second recess that is capable of storing at least a part of the terminal device, the part including the first recess;
    a locker formed to be engageable with the first recess, and the locker being engaged with the terminal device, which is stored in the second recess, of the terminal device to hold the terminal device; and
    a push up member that is connected to the locker, and pushes up the locker engaged with the terminal device, thereby pushing up the terminal device from the second recess,
    wherein when the terminal device is pushed up from the second recess, the locker is engaged with the first recess.

2. The cradle device according to claim 1, wherein
    the push up member is pushed down by the locker which is pressed by the terminal device as being engaged with the first recess of the terminal device, at a time when the terminal device is to be stored in the second recess.

3. The cradle device according to claim 1, wherein
    the push up member is movable between a storage position where the terminal device is stored in the second recess and a pop-up position where the terminal device is pushed up from the second recess, and
    the locker is movable between a locking position where the locker is engaged with the first recess and a release position where the locker is released from the engagement with the first recess.

4. The cradle device according to claim 3, wherein
    the locker includes:
    a third face that is capable of being in contact with a first face of the first recess at the locking position, the first recess having the first face opposite to a bottom surface of the second recess when the terminal device is stored in the second recess and a second face opposite to the first face, the third face being in contact with the first face to press the first face when the terminal device is pushed up from the second recess, and being in contact with the first face to be pressed by the first face at a time when the terminal device is to be stored in the second recess; and
    a fourth face that is capable of being in contact with the second face of the first recess at the locking position, the fourth face being in contact with the second face of the first recess to hold the terminal device, when the terminal device is stored in the second recess and when the terminal device is pushed up from the second recess.

5. The cradle device according to claim 3, further comprising:
    a button that is movable between a first position and a second position; and
    a movable member that is movable between a third position where the push up member is held at the storage position and a fourth position which allows the push up member to move from the storage position to the pop-up position, the movable member moving from the third position to the fourth position by being pressed by the button moving from the first position to the second position.

6. The cradle device according to claim 5, wherein
    the movable member is held at the fourth position by the push up member located at the pop-up position, and moves from the fourth position to the third position due to the movement of the push up member from the pop-up position to the storage position,
    the movable member pressing the button to move the button to the first position from the second position when moving from the fourth position to the third position.

7. The cradle device according to claim 5, further comprising:
    a pop-up spring that biases the push up member from the storage position toward the pop-up position.

8. The cradle device according to claim 5, further comprising:
    a locking spring that biases the locker from the release position toward the locking position.

9. The cradle device according to claim 5, further comprising:
    a spring that biases the movable member from the fourth position toward the third position.

10. The cradle device according to claim 1, wherein the push up member is directly connected to the locker.

11. A cradle set comprising:
    a terminal device having a first recess; and
    a cradle device that removably stores the terminal device,
    wherein the cradle device includes:
        a second recess that is capable of storing at least a part of the terminal device, the part including the first recess;
        a locker formed to be engageable with the first recess, and the locker being engaged with the terminal device, which is stored in the second recess, of the terminal device to hold the terminal device; and
        a push up member that is connected to the locker, and pushes up the locker engaged with the terminal device, thereby pushing up the terminal device from the second recess,
    wherein when the terminal device is pushed up from the second recess, the locker is engaged with the first recess.

12. The cradle set according to claim 11, wherein the push up member is directly connected to the locker.

* * * * *